(12) United States Patent
Gukal (10) Patent No.: US 10,019,510 B2
(45) Date of Patent: Jul. 10, 2018

(54) INDEXING AND SEARCHING LOG RECORDS USING TEMPLATES INDEX AND ATTRIBUTES INDEX

(71) Applicant: CA, INC., Islandia, NY (US)

(72) Inventor: Sreenivas Gukal, Santa Clara, CA (US)

(73) Assignee: CA, Inc., Islandia, NY (US)

( * ) Notice: Subject to any disclaimer, the term of this patent is extended or adjusted under 35 U.S.C. 154(b) by 568 days.

(21) Appl. No.: 14/445,232

(22) Filed: Jul. 29, 2014

(65) Prior Publication Data

US 2016/0034510 A1 Feb. 4, 2016

(51) Int. Cl.
*G06F 17/30* (2006.01)
(52) U.S. Cl.
CPC ............................ *G06F 17/30613* (2013.01)
(58) Field of Classification Search
CPC ................................................ G06F 17/30613
See application file for complete search history.

(56) References Cited

U.S. PATENT DOCUMENTS

| | | | | | |
|---|---|---|---|---|---|
| 7,822,850 | B1 * | 10/2010 | Brikman | ........... | G06F 17/30914 707/999.102 |
| 8,112,425 | B2 * | 2/2012 | Baum | ............... | G06F 17/30551 707/746 |
| 8,209,567 | B2 * | 6/2012 | Cohen | ................. | G06F 11/3476 714/26 |
| 8,380,752 | B2 * | 2/2013 | Botros | .............. | G06F 17/30991 707/802 |
| 8,533,193 | B2 * | 9/2013 | Hubbard | ........... | G06F 17/30637 707/737 |
| 8,990,184 | B2 * | 3/2015 | Baum | ............... | G06F 17/30551 707/711 |
| 9,026,550 | B2 * | 5/2015 | Fradkin | ............. | G06F 17/30424 707/769 |
| 2012/0330909 | A1 * | 12/2012 | Bird | .................. | G06F 17/30516 707/693 |
| 2013/0198227 | A1 * | 8/2013 | Fradkin | ............. | G06F 17/30424 707/769 |
| 2014/0032568 | A1 * | 1/2014 | Leko | .................. | G06F 17/30625 707/743 |
| 2015/0213631 | A1 * | 7/2015 | Vander Broek | ....... | G06T 11/206 345/589 |
| 2016/0253229 | A1 * | 9/2016 | Sade | ................... | G06F 11/3476 714/37 |

\* cited by examiner

*Primary Examiner* — Jeff A Burke
(74) *Attorney, Agent, or Firm* — Sage Patent Group (57) ABSTRACT

A computer partitions a log stream into records having defined intervals. For each of the records, the computer selects a template from among a set of templates in a templates index repository based on an identifier for the record being associated in the templates index repository with the template, identifies an attribute contained in the record based on the template, and stores the attribute associated with an identifier for the record and an identifier for the template in an attributes index repository. The attributes index repository and the templates index repository are used to retrieve records responsive to search queries.

16 Claims, 4 Drawing Sheets

FIGURE 1

FIGURE 2
(Indexing Sequence)

*FIGURE 3*

FIGURE 4

INDEXING AND SEARCHING LOG RECORDS USING TEMPLATES INDEX AND ATTRIBUTES INDEX

TECHNICAL FIELD

The present disclosure relates to computer systems and more particularly to analysis of records of log streams generated by computer equipment.

BACKGROUND

Data centers can contain thousands of servers (both physical and virtual machines), with each server running one or more software applications. The servers and software applications generate log stream records to indicate their current states and operations. For example, software applications may output log records that sequentially list actions that have been performed and/or list application state information at various checkpoints or when triggered by defined events (e.g., faults) occurrences, etc.

These log records are stored and searched by systems operators for various purposes—e.g., to detect anomalies, troubleshoot problems, mine information, check the health of the servers etc. The log records can be generated on the order of millions per second in large data centers.

In existing processes, the log records are stored in a full-text index (FTI). An FTI allows complex text queries to be performed on the log records. Operators typically perform iterative full-text queries on the FTI of log records. The storage requirements of an FTI are proportional to the number of terms in the log records. The log records can be generated on the order of millions per second for large data centers. At these rates, storing the log records efficiently (both in terms of space and time), while also allowing for efficient searches, can be a significant challenge.

SUMMARY

Some embodiments disclosed herein are directed to a method by a computer. The method includes partitioning a log stream into records having defined intervals. For each of the records, operations are performed to select a template from among a set of templates in a templates index repository based on an identifier for the record being associated in the templates index repository with the template, identify an attribute contained in the record based on the template, and store the attribute associated with an identifier for the record and an identifier for the template in an attributes index repository.

The attributes index repository and the templates index repository are used to retrieve records responsive to search queries.

Some other embodiments disclosed herein are directed to a computer program product that includes a computer readable storage medium having computer readable program code embodied therewith. The computer readable program code includes computer readable program code to partitioning a log stream into records having defined intervals. For each of the records, further computer readable program code selects a template from among a set of templates in a templates index repository based on an identifier for the record being associated in the templates index repository with the template, identifies an attribute contained in the record based on the template, and stores the attribute associated with an identifier for the record and an identifier for the template in an attributes index repository.

It is noted that aspects described with respect to one embodiment may be incorporated in different embodiments although not specifically described relative thereto. That is, all embodiments and/or features of any embodiments can be combined in any way and/or combination.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments of the present disclosure are generally directed to processing log stream records using templates to identify attributes within the records that are to be indexed in a FTI. The operations may substantially improve efficiency with how log records are indexed and searched, and which may enable processing of log records to be batch processed and may provide improved compression of storage space used by the FTI. The log records may be indexed in the FTI without loss of information or with reduced loss of information from the log records. Some related embodiments are generally directed to operations for searching the index which may be performed more efficiently and/or quickly, and which may be performed with the full functionality of an FTI.

Figure 1:
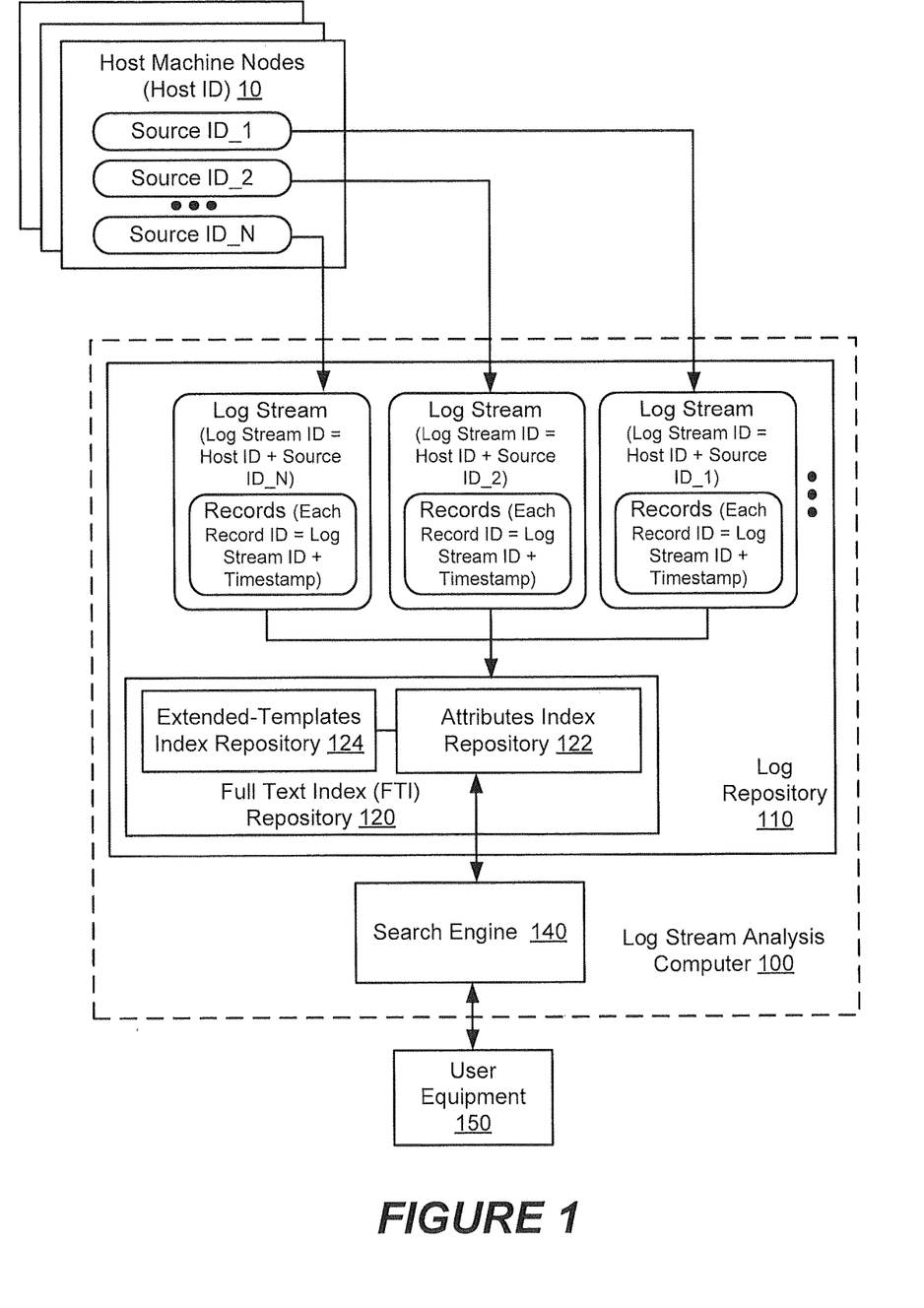
FIG. 1 is a block diagram of a system containing a log stream analysis computer that generates an attributes index repository and a templates index repository which are used to store and retrieve content of records responsive to full-text search queries, in accordance with some embodiments.

Some embodiments are disclosed herein in the context of the nonlimiting example block diagram of FIG. 1. A log stream analysis computer 100 receives log streams from one or more software sources executed by each of one or more host machine nodes 10. In the embodiment of FIG. 1, the log stream analysis computer 100 receives log streams from N different software sources (identified as Source ID_1, Source ID_2, . . . Source ID_N) executed by the host machine node 10 identified by a Host ID, and can further receive log streams from other software sources executed by other host machine nodes. A host machine node is also referred to as a "host node" and "host" for brevity.

A host machine node can include a physical host machine and/or a virtual machine (VM). The physical host machine includes circuitry that performs computer operations to execute one or more software sources. The physical host machine may include, without limitation, network content servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The physical host machine may include computer resources such as: processor(s), such as a central processing unit (CPU); network interface(s); memory device(s); mass data storage device(s), such as disk drives, solid state nonvolatile memory, etc.; etc.

A physical host machine can provide one or more VMs that execute one or more software sources. A virtual hypervisor can provide an interface between the VMs and a host operating system that allows multiple guest operating systems and associated software sources to run concurrently on a physical host machine. The host operating system is responsible for the management and coordination of activities and the sharing of the computer resources of the physical host machine.

Each software source belongs to a source type. For example, a "SQL Server" may be a source type and each installation of SQL Server is a software source belonging to the source type. Multiple sources of the same or different source types may be on the same host, and a software source may migrate between hosts. Each host and software source is identified by a unique identifier, Host ID and Source ID respectively. A log stream (generated by a software source of a particular host) can be uniquely identified by a compound identifier generated from combination of the Host ID and Source ID, or in some embodiments may be uniquely identified by an identifier generated from the Source ID.

In the embodiment of FIG. 1, one software source executed by the host outputs a log stream uniquely identified (Log Stream ID) as a combination of an identifier of the host (Host ID) and an identifier of the software source (Source ID_1). Another software source executed by the host outputs a log stream uniquely identified (Log Stream ID) as a combination of an identifier of the host (Host ID) and an identifier of the software source (Source ID_2). Similarly, a N'th software source executed by the host outputs a log stream uniquely identified (Log Stream ID) as a combination of an identifier of the host (Host ID) and an identifier of the software source (Source ID_N). Other hosts would be identified by different Host IDs.

The log stream analysis computer 100 partitions the received log streams into corresponding records according to a defined time interval (e.g., a defined number of minutes or hours) or other defined event or rule. The records are stored in a log repository 110 (e.g., mass data storage devices such as networked servers). Each record may be uniquely identified by an identifier (Record ID or DocID) that is formed from a combination (e.g., concatenation) of the corresponding (Log Stream ID) from which the record was partitioned and a timestamp associated with the defined time interval or other defined event or rule. The record identifier is unique across all the log records for all log streams. The interval size can be determined based on a trade-off analysis between storage space requirements and accuracy.

A search engine 140 is provided that allows a user, via user equipment 150 (e.g., desktop computer, laptop computer, tablet computer, smart phone, etc.), to perform full text searches of content of the log stream records. In a full-text search, a search engine can examine all of the terms (e.g., words or other text) in every stored record as it tries to match search criteria (e.g., text keywords) specified by an operator (or other user) in a search query. However, because of the large number of records that can be generated in data centers and many other environments and the potential large number of search queries that can be concurrently performed (e.g., based on search queries from numerous user equipment 150), a full-text search of all terms in every stored record would consume excessive computational resources of the search engine 140 and require excessive time to perform.

To improve the searching efficiency and timeliness, a full text index (FTI) repository 120 scans the terms of all records and builds indexes that identifies unique terms (e.g., characters, words, phrases, strings, etc) contained in identified records, and updates the indexes responsive to the content of incoming log streams. The FTI repository 120 may employ language-specific stemming on the terms being indexed. For example, the words "drives", "drove", and "driven" can be recorded in the index under the single term "drive."

The record identifier (e.g., Record ID or DocID) is used for indexing a log record, in the FTI repository 120. A query search on the FTI repository 120 can retrieve many record identifiers that satisfy the query. The record identifiers are used to retrieve the corresponding full records of the log streams stored in the log repository 110.

As explained above, log records can be generated on the order of millions per second for large data centers. At these rates, storing the log records efficiently (both in terms of space and time), while also allowing for efficient searches, can be a significant challenge.

In accordance with at least some embodiments disclosed herein, the FTI repository 120 includes an extended-templates index repository 124 (E-Templates Index repository) and an attributes index repository 122 that are used to index records of log streams. The extended-templates index repository 124 can be separate from the attributes index repository 122, residing in different memory devices or residing in different memory partitions of a same memory device. The extended-templates index repository 124 can be separately managed from the attributes index repository 122, with software that performs queries of the templates index repository being separate from software that performs queries of the attributes index repository. Separating these repositories 122 and 124 can allow parallel processing of queries therein to be performed without operational interference to each other.

In accordance with at least some embodiments disclosed herein, the records of a log stream generated by a source (either a hardware server or a software application) correspond to templates within a defined set. Each template can, for example, correspond to a "print" or other output routine in the software code of the source, which has an invariant part (e.g., which does not vary between "prints") and a variant part such as a term (e.g., alphanumeric text, strings of text, etc.) that is inserted in the print statement whenever the print statement is executed. The invariant part may provide content for the variant part, such as intended for better human understanding of the variant part. The variant part may be applicant names, event identifiers, values characterizing an application state at an instant of time, processing error codes, etc. A template can therefore be generated based on structure of a log stream that is output by software code of a source of the log stream. The terms of the variant part can freely change over time and therefore can vary within a same record and between records of a same log stream. The search engine 140 and/or the log repository 110 can operate to process the records to identify the variant and invariant parts of each record.

The invariant part of a log record is referred to herein as a "template" and the variant part is referred to as an "attribute." Each template or attribute may have multiple terms. The variant (attribute) part of a record can be much smaller size than the invariant (template) part of a record.

Generating Indexes for Records of the Log Streams

Figure 2:
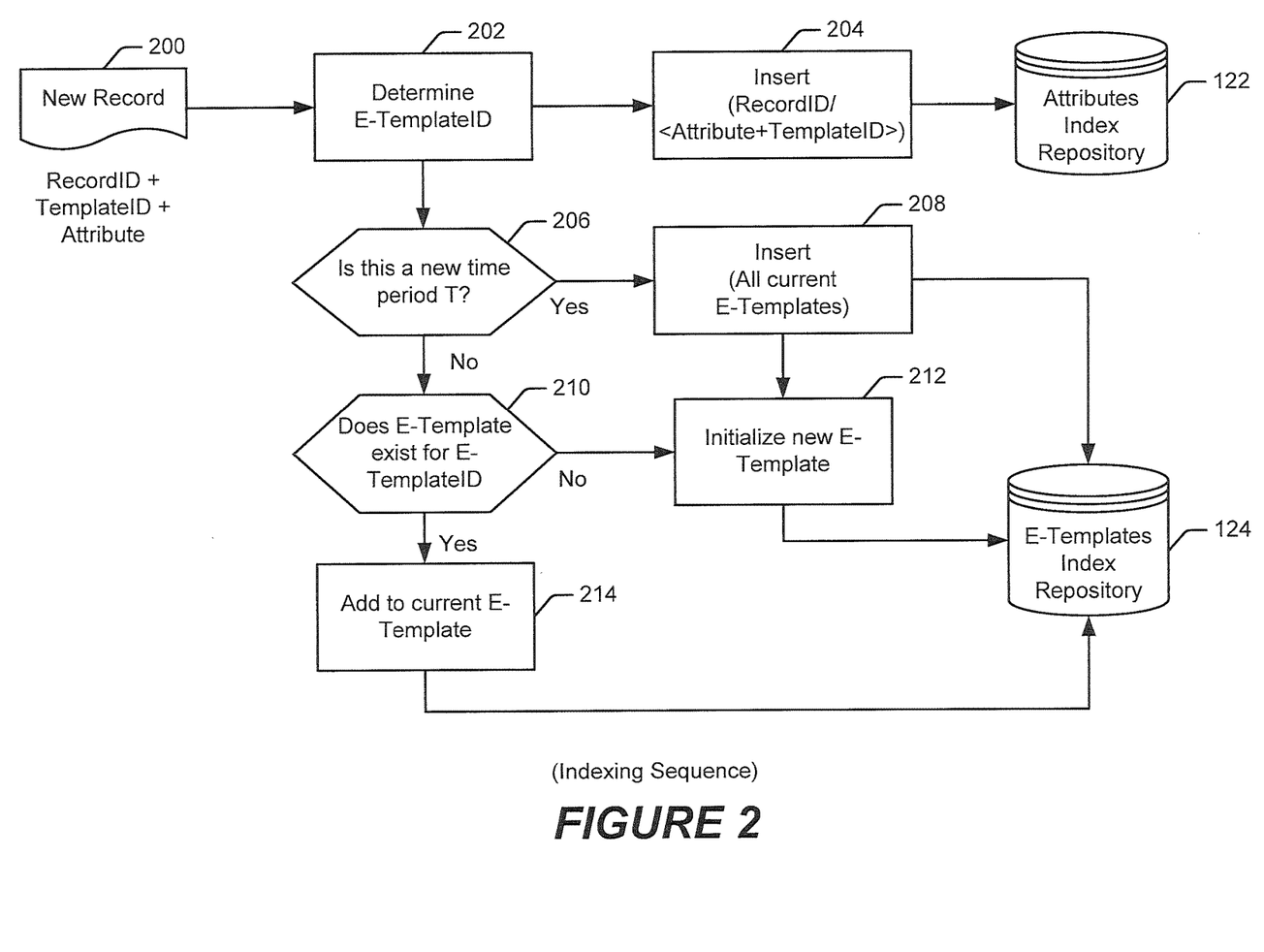
FIG. 2 is a flowchart of operations by a log stream analysis computer to index records across the attributes index repository and the templates index repository, in accordance with some embodiments.

FIG. 2 illustrates a flowchart of operations that may be performed by the search engine 140, the log repository 110, and/or another component of the log stream analysis computer 100 to generate a FTI repository 120 which includes the E-templates index repository 124 and the attributes index repository 122, in accordance with some embodiments. As explained above, log streams are received from software sources and/or host machine nodes 10 and are partitioned into records according to a defined time period or other interval (e.g., a defined number of minutes or hours), range, or other defined event or rule. The records are stored in memory devices of a log repository 110 (e.g., mass data storage devices such as servers).

Referring to FIGS. 1 and 2, a new record is received (block 200) containing a record ID, a template ID, and one or more attributes. Each record of an incoming log stream is divided into its template and attribute parts. The number of templates in each record of a log stream can be fixed and relatively small compared to the log stream itself. Each of the templates is indexed in the E-templates index repository 124, which may be a relational database table, with a corresponding template index value (TemplateID) that is used a replacement for the actual template contained in a record. Each record can be processed to generate index information by identifying the record (RecordID), identifying one of the templates (TemplateID) defined in the attributes index repository 122 or generating a new template if one doesn't yet exist having terms corresponding to content of the record, and identifying one or more attributes (Attribute(s)), which may be strings, values, etc., at one or more defined locations in the record that are identified by the template. The attributes can be indexed (stored with reference identifiers) in the attributes index repository 122. Hence, each incoming record can be represented by the format (<RecordID> <TemplateID> <Attribute>).

Accordingly, the FTI repository 120 can index records of log streams using a combination of the E-templates index repository 124 and the attributes index repository 122. For each record, a template is determined, which is identified by an E-templateID and used to identify attribute(s) contained in the record. Accordingly, regarding FIG. 2, an E-templateID for the received record is determined (block 202). The template may identify one or more locations within the record where one or more attributes are located. Each attribute may be text, strings of text, numerical values, or other content of the record.

Each of the attributes identified in a record are stored or inserted (block 204) in the attributes index repository 122, such as appended to a string provided as a combination of the attribute and the E-templateID (<atttribute+<Template ID>). The RecordID can be used as a lookup key (pointer/reference) to query or otherwise access the attributes index repository 122 to retrieve one or more attributes stored in the attributes index repository 122.

The E-templates index repository 124 is generated as the union of all records that have the same template in a defined time period. By being the union, the E-templates index repository 124 is managed to store only the unique terms of the template, and may contain or provide a reference from which the attributes are identified in the records according to the template. This approach can reduce or minimize the storage requirements of the E-templates index repository 124.

In one embodiment, a user or component in the system specifies a time period or (T secs, which may be a power of 2) or other interval for the E-templates index repository 124. The log records can be batch processed grouped by the templateID for every time period T. One insertion can be made in the E-templates index repository 124 for every TemplateID identified in records of a log stream within the time period T or other interval. If a log stream has records belonging to N distinct template types in the time period T, then N insertions can be made in the E-templates index repository 124 for the time period T. The insertions in the E-templates index repository 124 can each include one or more terms (e.g., text) of the template concatenated or otherwise combined with all the distinct terms in the attributes of all log records that are of that template type in the time period.

The storage overhead for the E-templates index repository 124 can be comparable to the storage overhead of the attributes index repository 122. The E-templates index repository 124 has at most as many terms as in the attributes index repository 122, although it would have less in practice since only unique terms in the attributes are stored) and the one or more terms (e.g., text) of the template is stored once in every T time period.

The lookup key (pointer/reference) to query or otherwise access the E-templates index repository 124 can be derived from the record ID. If the time period is T secs (where T is a power of 2), the leading bits (64−log 2 T) of all the record IDs of all records of a log stream in an entry in the E-templates index repository 124 have the same value, according to one embodiment of the present disclosure. The leading bits (E-TemplateID) form the lookup key for the E-templates index repository 124.

In the further non-limiting embodiment of FIG. 2, a determination (block 206) is made whether the record corresponds to a new time period T and, if so, all current extended ("E")-templates are inserted into the E-templates index repository 124 for subsequent reference, and a new E-template is initiated 212 and stored in the E-templates index repository 124. In contrast, when it is determined (block 206) that it is not a new time period T, a further determination (block 210) is performed for whether an E-template corresponding to the E-TemplateID exists, and if not a new E-template is initialized (block 212) and stored in the E-templates index repository 124. In contrast, when it is determined (block 206) that an E-template corresponding to the E-TemplateID exists, reference to content of the new record is added (block 214) to the current E-template.

Searching the FTI Repository

Figure 3:
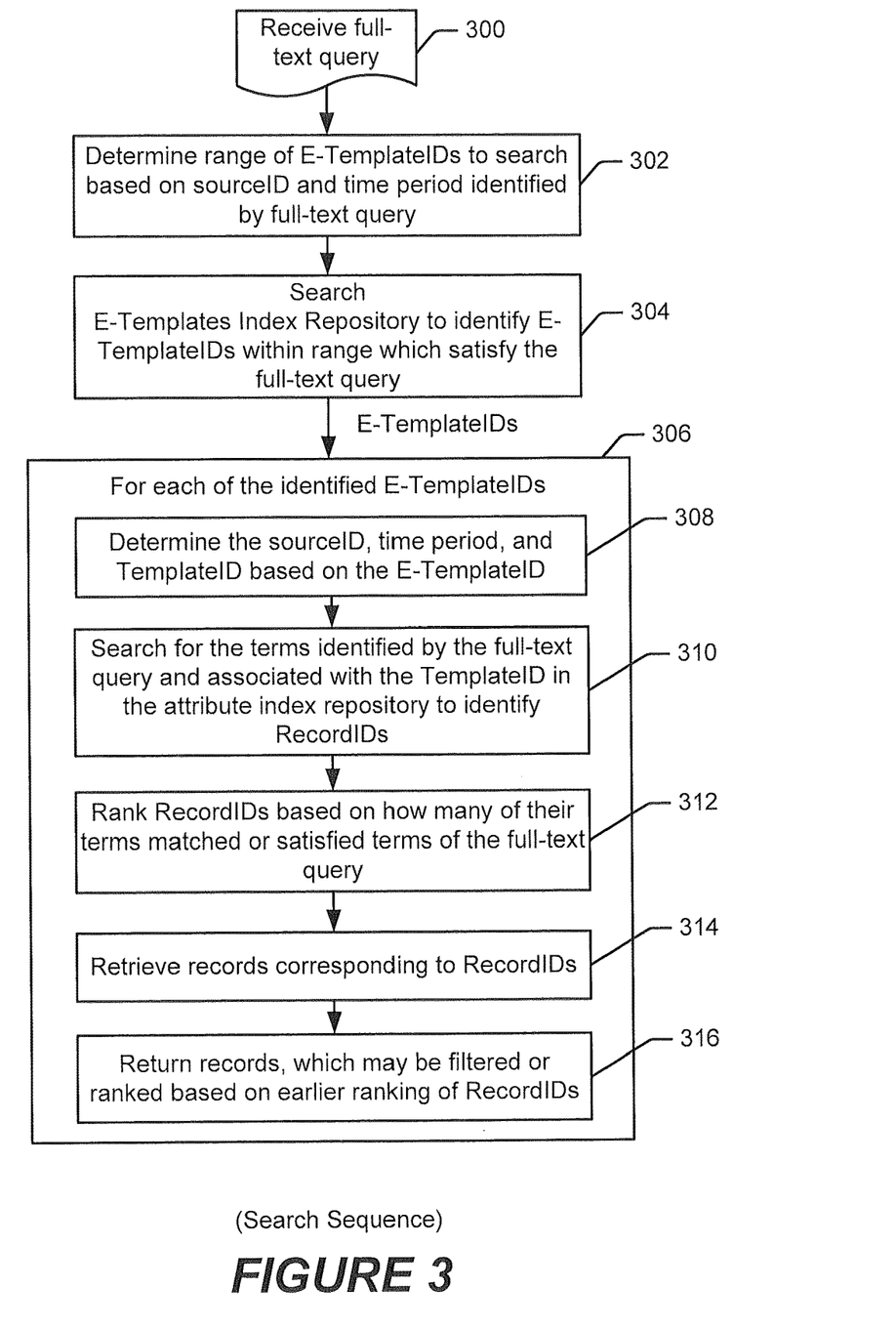
FIG. 3 is a flowchart of operations by a log stream analysis computer to search the attributes index repository and the templates index repository to identify a record that satisfies a full-text query, in accordance with some embodiments.

FIG. 3 illustrates a flowchart of operations that may be performed responsive to receipt of a full-text query to search the FTI repository 120 which includes the E-templates index repository 124 and the attributes index repository 122, in accordance with some embodiments. The operations may be performed by the search engine 140, although they may be at least partially or entirely performed by the log repository 110 and/or another component of the log stream analysis computer 100.

Referring to FIGS. 1 and 3, a full-text query is received (block 300), such as from the user equipment 150. The full-text query identifies one or more search terms and may further identify a source (sourceID) of a log stream that is to be searched and/or a time period or other interval to be searched.

A range of E-templateIDs that is to be searched is determined (block 302) based on the sourceID and the time period identified by the full-text query. When each of the E-templateIDs are formed from concatenation or other combining of the sourceID and the time period, the range of E-templateIDs can be determined (block 302) directly from the E-templateIDs themselves.

The E-templates index repository 124 is searched (block 304) to identify E-templateIDs within the determined range which satisfy content of the full-text query. If any log record belonging to a template satisfies the query, by design the corresponding extended-template (E-template) will also satisfy the query.

For each of the E-templateIDs that are identified (block 304), the following further operations are performed using those E-templateIDs. The sourceID, time period, and templateID are determined (block 308) based on the E-templateID. A search is performed (block 310) in the attribute index repository 122 to identify one or more terms therein that correspond to (e.g., match) one or more terms identified by the full-text query and which are associated with the templateID that was determined (block 308), and identifying from the attribute index repository 122 the recordIDs associated with those identified terms.

The recordIDs may be ranked (block 312) based on how many terms of the associated records match or otherwise satisfy terms of the full-text query.

The records corresponding to the recordIDs are retrieved (block 314) from the log repository 110. The log records may be retrieved by reading them from a repository ro they may be recreated by combining the associated template(s) and attributes. The records are returned (block 316), e.g., communicated to, the user equipment 150 and/or another device that was the source of the full-text query or which is identifiable based on the full-text query. The particular records which are returned (output) may be filtered or ranked based on a ranking (block 312) of the recordIDs.

It is noted that although the full-text query operations include searching two separate repositories (the attributes index repository and the E-templates index repository), each of the repositories can be more compact than a single FTI repository and associated search operations may be much less computationally intensive.

Further Operations to Index and Retrieve Records

Further more general operations are described below that may be performed to index records across the templates index repository and the attributes index repository, and retrieve records responsive to search queries using the templates index repository and the attributes index repository.

In some other embodiments, a computer, such as the log stream analysis computer 100, performs operations of a method that includes partitioning a log stream into records having defined intervals. For each of the records, the operations include selecting a template from among a set of templates in a templates index repository based on an identifier for the record being associated in the templates index repository with the template, identifying an attribute contained in the record based on the template, and storing the attribute associated with an identifier for the record and an identifier for the template in an attributes index repository.

For each of a plurality of log streams from a plurality of software sources executed by host nodes, the operations for partitioning, selecting, identifying, and storing cam be repeated. Accordingly, a plurality of log streams can be partitioned into records and indexed across the templates index repository and the attributes index repository.

Some further embodiments are directed to retrieve a record responsive to a search query. The operations include receiving a search query containing a search term, and identifying a plurality of the templates from among the set of templates in the templates index repository based on content of the search query. For each of the plurality of the templates that were identified, the operations include performing: identifying one of the attributes contained in the attributes index repository that is associated with an identifier for the template and satisfies the search term; obtaining from the attributes index repository the identifier for the record associated with the one of the attributes; retrieving the record using the identifier for the record that was obtained from the attributes index repository; and outputting the record as a response to the search query.

In a further embodiment, the operation of identifying a plurality of the templates from among the set of templates in the templates index repository based on content of the search query, includes identifying templates in the templates index repository associated with defined intervals that at least partially overlap an interval identified by the search query.

In a further embodiment, the log stream is partitioned into records having a defined time period. The operations include identifying a search time period and identifying a log stream source in the search query that was received. The plurality of the templates are identified from among the set of templates in the templates index repository based on the search time period and the log stream source.

In a further embodiment, a plurality of search terms contained in the search query are identified. The records identified for the plurality of the templates are ranked based on how many of the search terms are satisfied by the respective records, and operations filter which of the records are output based on the ranking.

Identification of the attribute contained in the record based on the template, may include determining a location of the attribute within the record based on the template.

Operations may determine that a template does not exist in the templates index repository for one of the records, and respond by inserting a new template in the templates index repository associated with an identifier for the one of the records. The new template may be generated based on structure of a log stream that is output by software code of a source of the log stream.

Operations may determine that one of the records corresponds to a new time period, and respond by inserting a new template in the templates index repository associated with an identifier for the one of the records and an identifier for the new time period.

Example Log Stream Analysis Computer

Figure 4:
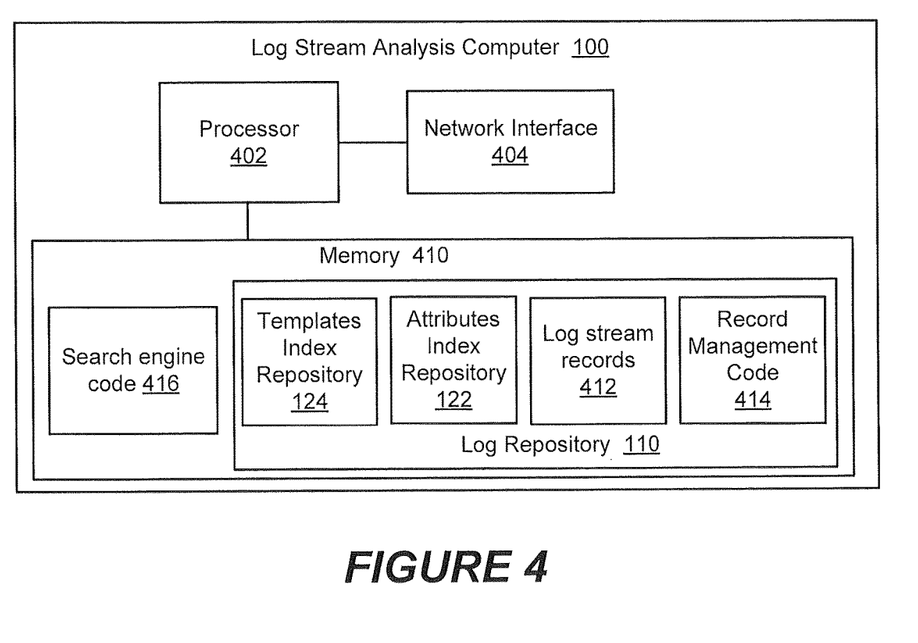
FIG. 4 is a block diagram of a log stream analysis computer configured according to some embodiments.

FIG. 4 is a block diagram of the log stream analysis computer 100 or a component thereof in FIG. 1 configured according to one embodiment. Referring to FIG. 4, a processor 402 may include one or more data processing circuits, such as a general purpose and/or special purpose processor (e.g., microprocessor and/or digital signal processor) that may be collocated or distributed across one or more networks. The processor 402 is configured to execute computer readable program code in a memory 410, described below as a computer readable medium, to perform some or all of the operations and methods disclosed herein for one or more of the embodiments. The program code can include search engine code 416 that is configured to perform one or more of the embodiments disclosed herein as being performed by the search engine 140. The program code can include record management code 414 that manages receipt, partitioning, storage of records, retrieval of records, and/or deletion of records, and may manage generation and access to one or more of the repositories. The memory 410 can include storage for the templates index repository 124, the attributes index repository 122, and the log stream records 412 described above. Although a single memory block 410 has been illustrated for simplicity, it is to be understood that any number, combination of types, and hierarchy of memory storage devices (e.g., solid state, disk drive, etc.) can be used. A network interface 404 can communicatively connect the processor 402 to the host machine nodes 10 and the user equipment 150 shown in FIG. 1.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to; electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a computer comprising:
partitioning each log stream of a plurality of log streams from a plurality of software sources executed by host nodes into records having defined intervals, each log stream having a template part and an attribute part;
for each of the records, performing:
responsive to a template from among a set of templates in a templates index repository based on an identifier for the record not existing; generating a new template having terms corresponding to content of the record and adding the new template to the set of templates in the templates index repository, wherein the templates index repository is generated as a union of all records that have the same template in a defined time period,
responsive to a template from among a set of templates in the templates index repository based on an identifier for the record existing, selecting the template from among the set of templates in the templates index repository based on an identifier for the record being associated in the templates index repository with the template, the template being an invariant part of the record,
identifying an attribute contained in the record based on the template, the attribute being a variant part of the record, and
storing the attribute associated with an identifier for the record and an identifier for the template in an attributes index repository;
receiving, via a network, a search query from a requesting device, the search query containing a search term and a time period;
searching the templates index repository to identify a plurality of the templates from among the set of templates in the templates index repository based on content of the search query and the time period; and
for each of the plurality of the templates that are identified, performing:
identifying one of the attributes contained in the attributes index repository that is associated with an identifier for the template and satisfies the search term,
obtaining from the attributes index repository the identifier for the record associated with the one of the attributes,
retrieving the record using the identifier for the record that was obtained from the attributes index repository, and
outputting the record as a response to the search query and transmitting the record via the network to the requesting device.

2. The method of claim 1, wherein identifying a plurality of the templates from among the set of templates in the templates index repository based on content of the search query, comprises:
identifying templates in the templates index repository associated with defined intervals that at least partially overlap an interval identified by the search query.

3. The method of claim 2, wherein:
the log stream is partitioned into records having a defined time period;
receiving the search query comprises identifying a search time period and identifying a log stream source; and
the plurality of the templates is identified from among the set of templates in the templates index repository based on the search time period and the log stream source.

4. The method of claim 1, further comprising:
identifying a plurality of search terms contained in the search query;
ranking the records identified for the plurality of the templates based on how many of the search terms are satisfied by the respective records; and filtering which of the records are output based on the ranking.

5. The method of claim 1, wherein identifying the attribute contained in the record based on the template, comprises:
determining a location of the attribute within the record based on the template.

6. The method of claim 1, further comprising:
determining that a template does not exist in the templates index repository for one of the records; and
inserting a new template in the templates index repository associated with an identifier for the one of the records.

7. The method of claim 6, wherein the new template is generated based on structure of a log stream that is output by software code of a source of the log stream.

8. The method of claim 1, further comprising:
determining that one of the records corresponds to a new time period; and
inserting a new template in the templates index repository associated with an identifier for the one of the records and an identifier for the new time period.

9. The method of claim 1, wherein the attribute comprises text contained in the record.

10. The method of claim 1, wherein:
software that performs queries of the templates index repository is separate from software that performs queries of the attributes index repository.

11. The method of claim 1, wherein:
receiving, via a network, the search query from the requesting device comprises receiving the search query from a user equipment; and
transmitting the record via the network to the requesting device comprises transmitting the record via the network toward the user equipment.

12. A computer program product comprising:
a computer readable storage medium having computer readable program code embodied therewith, the computer readable program code comprising:
computer readable program code to partition each log stream of a plurality of log streams from a plurality of software sources executed by host nodes into records having defined intervals, each log stream having a template part and an attribute part; and
computer readable program code to, for each of the records, perform:
responsive to a template from among a set of templates in a templates index repository based on an identifier for the record not existing; generating a new template having terms corresponding to content of the record and adding the new template to the set of templates in the templates index repository, wherein the templates index repository is generated as a union of all records that have the same template in a defined time period;
responsive to a template from among a set of templates in the templates index repository based on an identifier for the record existing, selecting the template from among the set of templates in the templates index repository based on an identifier for the record being associated in the templates index repository with the template, the template being an invariant part of the record;
identifying an attribute contained in the record based on the template, the attribute being a variant part of the record; and
storing the attribute associated with an identifier for the record and an identifier for the template in an attributes index repository;
computer readable program code to receive, via a network, a search query from a requesting device, the search query containing a search term and a time period;
computer readable program code to search the templates index repository to identify a plurality of the templates from among the set of templates in the templates index repository based on content of the search query and the time period;
computer readable program code to, for each of the plurality of the templates that are identified, perform:
identifying one of the attributes contained in the attributes index repository that is associated with an identifier for the template and satisfies the search term;
obtaining from the attributes index repository the identifier for the record associated with the one of the attributes;
retrieving the record using the identifier for the record that was obtained from the attributes index repository; and
outputting the record as a response to the search query and transmitting the record via the network to the requesting device.

13. The computer program product of claim 12, wherein identifying a plurality of the templates from among the set of templates in the templates index repository based on content of the search query, comprises:
identifying templates in the templates index repository associated with defined intervals that at least partially overlap an interval identified by the search query.

14. The computer program product of claim 13, wherein:
the log stream is partitioned into records having a defined time period;
receiving the search query comprises identifying a search time period and identifying a log stream source; and
the plurality of the templates is identified from among the set of templates in the templates index repository based on the search time period and the log stream source.

15. The computer program product of claim 12, the computer readable program code further comprising:
computer readable program code to identify a plurality of search terms contained in the search query;
computer readable program code to rank the records identified for the plurality of the templates based on how many of the search terms are satisfied by the respective records; and
computer readable program code to filter which of the records are output based on the ranking.

16. The computer program product of claim 12, the computer readable program code further comprising:
computer readable program code to determine a location of the attribute within the record based on the template.

* * * * *